J. S. NELSON.
Breast-Strap Roller.
No. 210,349. Patented Nov. 26, 1878.
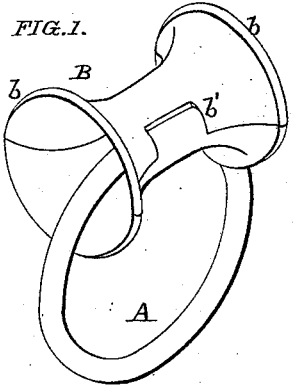
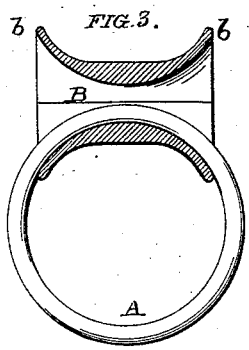
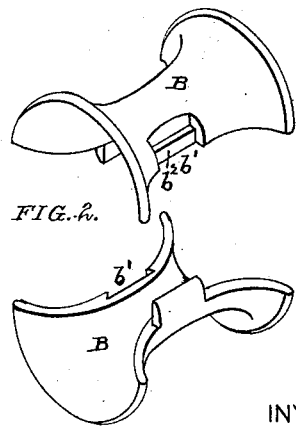
ATTEST:
Chas J. Gooch
A. H. Galt
INVENTOR:
James S. Nelson
By Knight Bros
Attys.

UNITED STATES PATENT OFFICE.

JAMES S. NELSON, OF HILLSBOROUGH, ILLINOIS.

IMPROVEMENT IN BREAST-STRAP ROLLERS.

Specification forming part of Letters Patent No. 210,349, dated November 26, 1878; application filed October 18, 1877.

*To all whom it may concern:*

Be it known that I, JAMES S. NELSON, of Hillsborough, in the county of Montgomery and State of Illinois, have invented a certain new and useful Improvement in Breast-Strap Rollers, of which the following is a full, clear, and exact description, reference being had to the accompanying drawings, making part of this specification.

My improvement consists in the construction of the roller in two similar sections, each of which is made with a peculiar beveled and ribbed rectangular recess upon one side, and with a lug upon the other side fitted to clinch down into the recess of the other section and lock the parts together.

In the drawings, Figure 1 is a perspective view of the end neck-yoke ring with my roller applied thereto. Fig. 2 is a perspective view of the parts of the roller detached. Fig. 3 is a section axial to the roller.

A is an ordinary ring, such as is found upon each end of the neck-yoke, and upon this ring is the roller B, turning on the ring A as a pivot. The roller is made upon the outside, so as to fit the breast-strap, which passes beneath it, (through the ring,) and has end flares or flanges $b$, to prevent the strap running off laterally.

The interior of the roller flares toward both ends, so as to exactly fit the curve of the ring, so that the wear and bearing are even and easy, and there is no space between the flanges $b$ and the ring A that the strap can become jammed into; but the ring acts as end guards to keep the strap from flying off the roller.

I make my roller in two sections, as shown, each section having upon one side a beveled recess, $b^1$, with a rectangular rib, $b^2$, said recess being formed to receive a beveled lug upon the side of the other section, which lug is cast in a tangential position, and after the sections are put together the lug is clinched down into the recess and holds the parts together.

I intend to make my rollers of malleable iron, as the most available material; but I do not confine myself to this, as they may be made of any metal that would answer the purpose intended; and I do not confine myself to the exact manner of fastening the sections together, but to any fastening that would be substantially equivalent to it.

I claim as my invention—

The anti-friction roller B, made in two similar sections, each provided with ribbed recess and lug $b^1$ and $b^2$, substantially as and for the purpose set forth.

JAMES S. NELSON.

Witnesses:
SAML. KNIGHT,
C. W. H. BROWN.